L. J. DAVIES.
MULTIPLE WHEEL DRIVE FOR TRACTORS.
APPLICATION FILED MAR. 20, 1919.
1,350,071.
Patented Aug. 17, 1920.
3 SHEETS—SHEET 3.
Fig. 5.
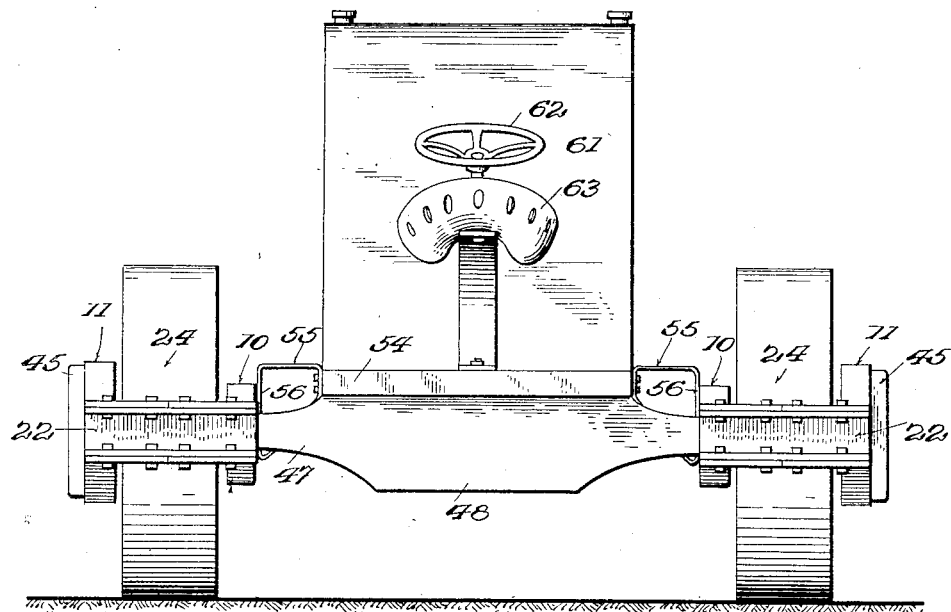
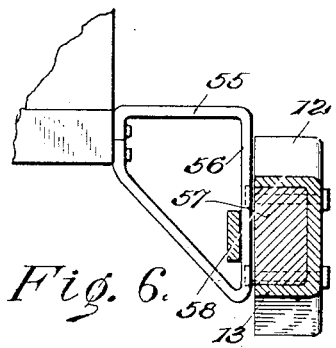
Fig. 6.
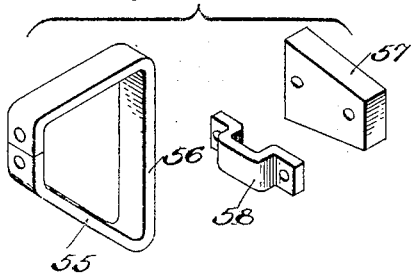
Fig. 7.
Inventor
L. J. Davies.
By Lacey & Lacey, Attys.

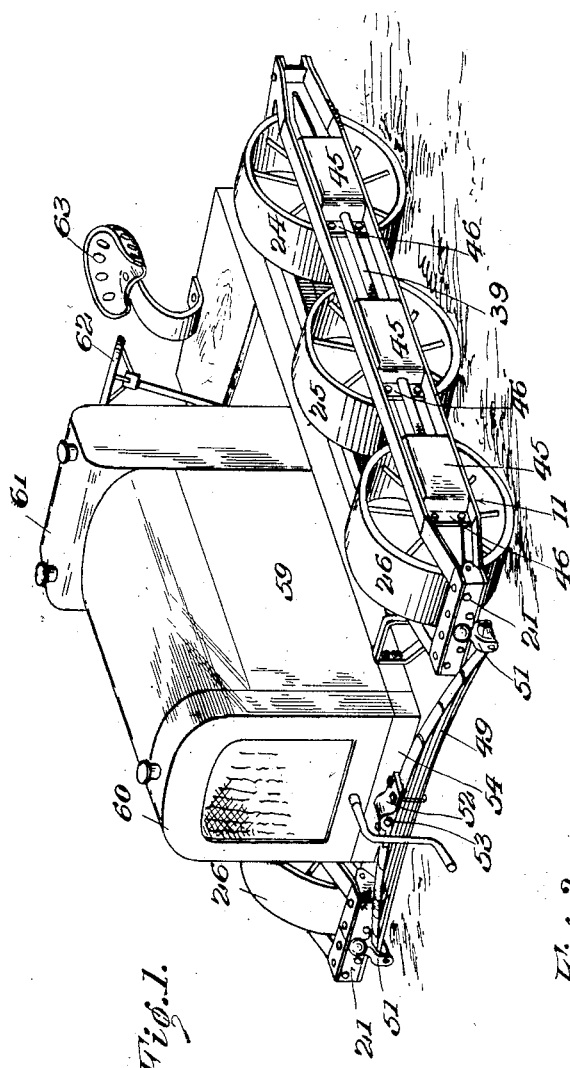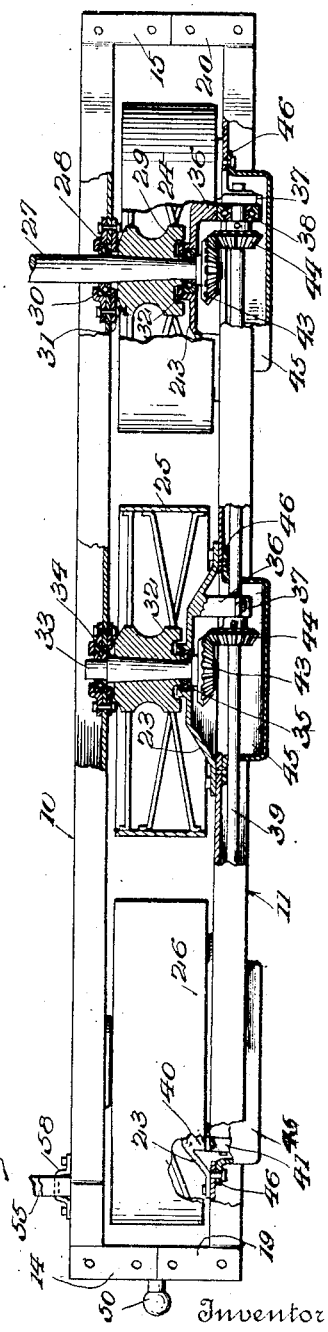

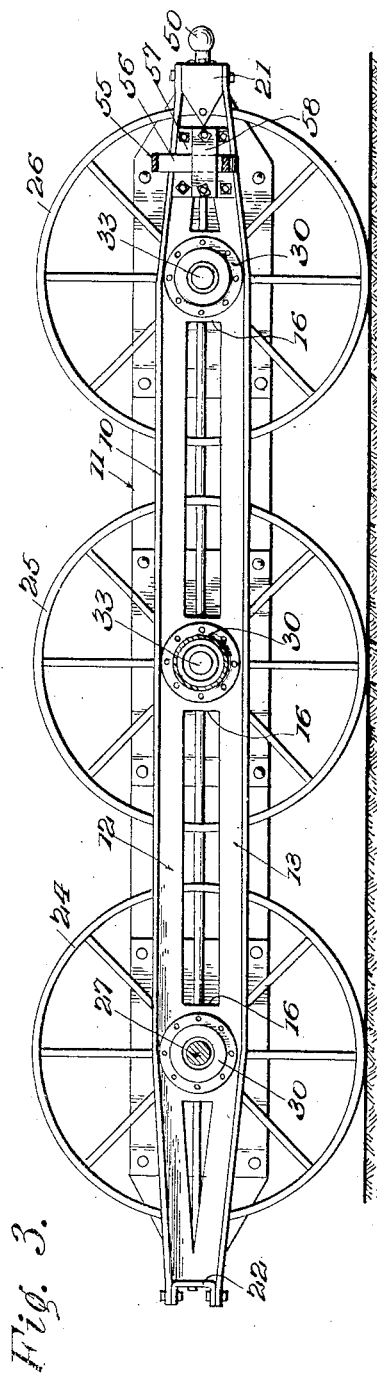
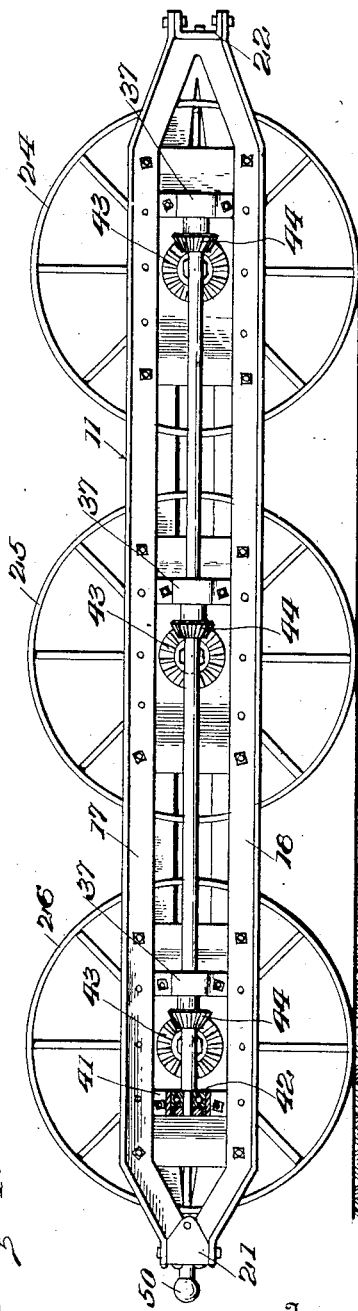

UNITED STATES PATENT OFFICE.

LLEWELYN J. DAVIES, OF TWIN LAKES, COLORADO.

MULTIPLE-WHEEL DRIVE FOR TRACTORS.

1,350,071.   Specification of Letters Patent.   Patented Aug. 17, 1920.

Application filed March 20, 1919. Serial No. 283,813.

*To all whom it may concern:*

Be it known that I, LLEWELYN J. DAVIES, citizen of the United States, residing at Twin Lakes, in the county of Lake and State of Colorado, have invented certain new and useful Improvements in Multiple-Wheel Drives for Tractors, of which the following is a specification.

This invention relates to an improved multiple wheel drive for tractors and has as its primary object to provide a construction wherein drive units having two or more drive wheels each, will be employed at opposite sides of the tractor.

The invention has as a further object to provide an arrangement wherein all of the drive wheels of each unit will be coupled with a common driven shaft and wherein the driven shafts of the units will be coupled with the rear axle of the tractor.

And the invention has as a still further object to provide an improved and simplified type of tractor drive unit.

Other and incidental objects will appear during the course of the detailed description of the invention. In the drawings, wherein I have illustrated the preferred embodiment of the invention, and wherein similar reference characters designate corresponding parts throughout the several views:

Figure 1 is a perspective view of a tractor embodying my improved multiple wheel drive, Fig. 2 is a fragmentary plan view of the left hand drive unit of the tractor, parts being broken away and shown in section in order to more clearly illustrate certain details.

Fig. 3 is an elevation looking at the inner side of the left hand drive unit,

Fig. 4 is a view similar to Fig. 3 looking at the outer side of the left hand drive unit, the gear housing caps employed being removed, Fig. 5 is a rear elevation of the tractor.

Fig. 6 is a detail view showing one of the couplings between the front end of the tractor chassis and the drive units, and Fig. 7 is a perspective view showing one of said couplings detached.

In the drawings, I have, in Fig. 1, illustrated a tractor embodying my improved multiple wheel drive. Drive units are employed at opposite sides of the tractor and since these drive units are identical, only one will be described in detail, the left hand unit being chosen. However, similar reference numerals will be applied to corresponding parts of both of the units. Referring now more particularly to Figs. 2, 3 and 4 of the drawings, it will be seen that this drive unit includes an oblong frame comprising inner and outer parallel frame members, each indicated as a whole at 10 and 11 respectively. These frame members are preferably formed of suitable sheet metal. As particularly brought out in Fig. 3, the inner frame member includes parallel upper and lower angle bars 12 and 13 which converge adjacent the ends of the member and merge into each other at its ends to form an angularly directed channel shaped terminal 14 at the front end of the member and a similar terminal 15 at the rear end of the member. Extending between the bars 12 and 13, at suitably spaced points therealong, are connecting webs 16. The outer frame member is quite similar to the inner frame member and includes, as shown in Fig. 4, spaced upper and lower angle bars 17 and 18, converging adjacent the ends of the member and merging at its ends to form an angularly directed channel shaped terminal 19 at the front end of the member and a similar terminal 20 at the rear end of the member. The terminals 14 and 19 of the frame members abut as do the terminals 15 and 20 thereof. Connecting the former terminals is a cross bar 21 while a substantially channel shaped cross bar 22 connects the latter terminals. A rigid frame is thus provided.

Riveted or otherwise secured to the bars 17 and 18 of the frame member 11, at the inner sides of said bars, are spaced bearing plates 23 which serve to brace the bars with respect to each other. These bearing plates are disposed opposite the connecting webs 16 of the inner frame member 10 and the intermediate portions of the plates are, as particularly brought out in Fig. 2, bent inwardly away from the bars of the outer frame member. Mounted between these frame members 10 and 11 is a set of alined drive wheels 24, 25 and 26, respectively. The drive wheel 24 is mounted upon the adjacent end of the rear axle drive shaft 27 of the tractor. This drive shaft projects through the rearmost web 16 of the frame member 10 and through the corresponding bearing plate 23 of the frame member 11, being supported by a suitable roller bearing 28 carried by the web and a similar roller bearing 29 mounted upon the bearing plate. The bearing 28 is housed within a retaining ring 30 therefor seating against the outer face of the web and connected to the web by rivets or other suitable fastening devices which engage a reinforcing plate 31 seating against the inner face of the web and surrounding the shaft. The bearing 29 is carried by an inwardly directed annular flange 32 formed on the bearing plate and, as will be observed, the outer end of the hub of the wheel is channeled to receive this flange. The drive wheel may be of any approved type and the hub thereof is suitably fixed to the adjacent terminal of the shaft 27 to rotate therewith. Fitted through the intermediate connecting web and bearing plate as well as through the foremost connecting web and bearing plate are stub shafts 33 supported at their inner ends by roller bearings 34 similar to the bearings 28 and mounted in like manner. Supporting the outer ends of the shafts are roller bearings 35 similar to the bearings 29 and mounted in a similar manner. The drive wheels 25 and 26 are similar to the wheel 24 and the hubs thereof are fixed to the stub shafts 33 to turn therewith. In this connection, it may be observed that while I have shown a set of three drive wheels upon each unit, still, I do not wish to be limited in this regard since, as will appear as the description proceeds, the number of wheels to be used in a set may be easily varied.

Formed on the bearing plates 23 in the rear of the axle shaft 27 as well as in the rear of the stub shafts 33, are alined half bearing blocks 36 to the outer ends of which are bolted or otherwise secured half bearing plates 37. These bearing plates coact with the blocks for supporting roller bearings 38 through which is journaled a driven shaft 39 intersecting the plane of the drive and stub shafts. At the forward side of the foremost stub shaft or that shaft carrying the wheel 26, the foremost bearing plate 23 is provided with a half bearing block 40 to which is connected a half bearing plate 41 supporting a roller bearing 42 upon the block and, as will be observed, the forward end of the shaft 39 is journaled in this bearing. Keyed or otherwise secured upon the adjacent outer end of the axle shaft 27 as well as the outer ends of the stub shafts are bevel gears 43 and fixed to the shaft 39 to coact with these gears are pinions 44. Thus, it will be seen that the set of wheels 24, 25 and 26 will be simultaneously driven from the drive shaft 27. Inclosing the pairs of gears 43 and 44 are dust caps 45 therefor. These dust caps are received between the upper and lower bars 17 and 18 of the outer frame member and, at their ends, are slotted to freely fit over the driven shaft 39. Formed on the ends of said caps are flanges 46 which receive bolts or other suitable fastening devices detachably securing the caps in place.

Having thus described one of the units in detail, attention is now directed to the fact that these units when assembled upon a tractor are disposed in substantially parallel relation so that the rear axle 27 supporting and driving the wheel 24 of the left hand unit, as previously described, will also support and drive the corresponding wheel of the right hand unit. At their rear ends the units are, of course, connected by said axle. This axle is received within a suitable rear axle housing 47 which may be formed integrally with a differential housing 48, in which latter housing is mounted any appropriate differential gear for driving the rear axle. At the front ends of the units I employ a spring 49 between the units. Arms 50 project forwardly from the front cross pieces 21 of the units and swung from these arms preferably by ball and socket joints, are shackles 51 to which the ends of the spring are swingingly connected. Mounted upon the spring medially thereof, is a saddle plate 52 journaling a trunnion 53 projecting from the forward end of the tractor chassis 54. At its rear end the chassis rests upon and is secured to the differential housing 48.

Connecting the front ends of the units with the chassis 54 are coupling brackets 55. These brackets are, as shown in detail in Fig. 7, each preferably formed from a metal strip having its ends abutted and bent to provide a vertical portion 56, the ends of the strip of each bracket being bolted or otherwise secured to one of the side bars of the chassis for rigidly connecting the brackets therewith. Fitting between the upper and lower bars 12 and 13 of the inner frame members of the drive units, adjacent the forward ends of said units, are blocks 57 bolted or otherwise secured to said frame members and connected to these blocks are keepers 58 slidably receiving the vertical portions of the brackets 55. Thus, these brackets will rigidly connect the drive units at their forward ends with the chassis 54 so as to prevent relative lateral movement of the front end portions of the units while, at the same time, vertical movement of the chassis will be permitted when the spring 49 is flexed.

The chassis 54 carries the engine of the tractor and associated parts, which may be of any approved type. Accordingly, the engine has not been shown. However, the engine is indicated at 59 and the hood of the engine radiator at 60. A fuel and oil supply tank for the engine is indicated at 61, this tank being mounted upon the chassis immediately in the rear of the hood. In the rear of this tank projects the steering column of the tractor upon which is mounted a steering wheel 62. Any approved type of steering mechanism may be employed in connection with the tractor. For instance, a steering mechanism associated with the differential gearing may be employed, such mechanism being operable for selectively coupling the engine with either section of the rear axle of the tractor so that the ground wheels of one of the units will be driven by the engine while the ground wheels of the other unit will turn idly. However, since such mechanism forms no part of the present invention, it has not been shown. Mounted upon the chassis in the rear of the steering column is a suitable seat 63.

Having thus described the invention, what is claimed as new is:

1. A multiple wheel drive including companion drive units connected together in parallel relation, each of said units comprising a supporting frame, shafts journaled upon the frame, one of said shafts providing a drive shaft, drive wheels carried by the shafts, a longitudinal countershaft journaled upon the frame and common to all of the first shafts, and a gear connection between the countershaft and said first mentioned shafts.

2. A multiple wheel drive including companion drive units connected together in parallel relation, each of said units comprising a supporting frame having inner and outer side frame members, shafts journaled upon the side frame members, one of said shafts providing a drive shaft, drive wheels mounted upon said shafts, a longitudinal countershaft journaled upon the outer side frame member at the outer ends of said first mentioned shafts, and a gear connection between the countershaft and said first mentioned shafts.

3. A multiple wheel drive including companion drive units connected together in parallel relation, each of said units comprising a supporting frame having parallel side frame members, bearings carried by the innermost of said frame members, bearing plates carried by the outermost of said frame members, bearings mounted upon said plates, shafts each journaled through a pair of said bearings, one of said shafts providing a drive shaft, bearing blocks carried by the plates, a countershaft mounted upon the said bearing blocks, and a drive connection between the countershaft and said first mentioned shafts.

4. A multiple wheel drive including companion drive units connected together in parallel relation, each of said units including a supporting frame having parallel side frame members each formed with spaced bars, webs connecting the bars of the innermost frame member, bearing plates connecting the bars of the outermost frame member, bearings mounted upon said webs and plates, a plurality of shafts each journaled through a pair of said bearings, one of said shafts providing a drive shaft, a countershaft carried by the outer frame member, gears on said first mentioned shafts, and pinions on the countershaft meshing with said gears.

In testimony whereof I affix my signature.

LLEWELYN J. DAVIES. [L. S.]